US009727279B2

United States Patent
Suzuki et al.

(10) Patent No.: US 9,727,279 B2
(45) Date of Patent: Aug. 8, 2017

(54) STORAGE CONTROL APPARATUS CONTROLLING ISSUABLE NUMBER OF REQUESTS AND STORAGE CONTROL METHOD THEREOF

(71) Applicant: FUJITSU LIMITED, Kawasaki-shi, Kanagawa (JP)

(72) Inventors: Tomonori Suzuki, Yokohama (JP); Atsushi Endo, Kawasaki (JP)

(73) Assignee: FUJITSU LIMITED, Kawasaki-Shi (JP)

( * ) Notice: Subject to any disclaimer, the term of this patent is extended or adjusted under 35 U.S.C. 154(b) by 68 days.

(21) Appl. No.: 14/333,624

(22) Filed: Jul. 17, 2014

(65) Prior Publication Data

US 2015/0032955 A1  Jan. 29, 2015

(30) Foreign Application Priority Data

Jul. 25, 2013 (JP) ................................ 2013-154585

(51) Int. Cl.
G06F 12/00 (2006.01)
G06F 3/06 (2006.01)

(52) U.S. Cl.
CPC ............ G06F 3/0689 (2013.01); G06F 3/061 (2013.01); G06F 3/0659 (2013.01); *G06F 2003/0692* (2013.01)

(58) Field of Classification Search
USPC .......................................................... 711/114
See application file for complete search history.

(56) References Cited

U.S. PATENT DOCUMENTS

| 6,366,981 B1 | 4/2002 | Koike | |
| 7,444,483 B2 * | 10/2008 | Taguchi | G06F 1/3221 711/112 |
| 7,552,280 B1 * | 6/2009 | Naamad | G06F 3/0611 711/114 |
| 2009/0300277 A1 * | 12/2009 | Jeddeloh | G06F 12/0246 711/104 |

(Continued)

FOREIGN PATENT DOCUMENTS

| JP | 8-63298 | 3/1996 |
| JP | 8-69359 | 3/1996 |

(Continued)

OTHER PUBLICATIONS

Japanese Office Action dated Feb. 7, 2017 in corresponding Japanese Patent Application No. 2013-154585.

*Primary Examiner* — Mardochee Chery
(74) *Attorney, Agent, or Firm* — Staas & Halsey LLP

(57) ABSTRACT

A storage control apparatus including a storage unit and a processor. The processor is configured to set an issuable number with respect to a logical volume on basis of a configuration of storage devices constituting the logical volume and performance of the storage devices. The issuable number is a number of requests issuable to the logical volume during a unit time period. The processor is configured to receive a request requesting access to the logical volume. The processor is configured to accumulate the received request in the storage unit. The processor is configured to issue requests accumulated in the storage unit to the logical volume while limiting a number of issued requests during the unit time period to a range of the issuable number.

10 Claims, 11 Drawing Sheets

(56) References Cited

U.S. PATENT DOCUMENTS

| | | |
|---|---|---|
| 2009/0307534 A1 | 12/2009 | Sakuramoto et al. |
| 2013/0007339 A1* | 1/2013 | Deguchi ............... G06F 3/0605 |
| | | 711/100 |
| 2013/0212349 A1* | 8/2013 | Maruyama ............. G06F 12/00 |
| | | 711/167 |
| 2015/0261462 A1* | 9/2015 | Miwa .................... G06F 3/0653 |
| | | 711/114 |

FOREIGN PATENT DOCUMENTS

| | | |
|---|---|---|
| JP | 11-167470 | 6/1999 |
| JP | 2005-332236 | 12/2005 |
| JP | 2008-186211 | 8/2008 |
| JP | 2009-294949 | 12/2009 |

* cited by examiner

| RAID LEVEL | DISK TYPE (REVOLVING SPEED) | BASIC NUMBER OF DISKS IN CONFIGURATION | UNIT OF TRANSFER (kbyte) | REQUIRED PERFORMANCE (MB/s) |
|---|---|---|---|---|
| RAID5 | 15krpm | 5 | >(N×8) | 400 |
| | | | (N×8)~(N×4+1) | 350 |
| | | | (N×4)~(N+1) | 300 |
| | | | N | 200 |
| | | | (N-1)~(N/4) | 100 |
| | | | (N/4-1)~(N/8) | 10 |
| | | | <(N/8) | 8 |

FIG. 8

| RAID GROUP IDENTIFICATION INFORMATION | UNIT OF TRANSFER (kbyte) | THE NUMBER OF ISSUABLE I/O |
|---|---|---|
| #1 | >(N×8) | k1×M |
| | (N×8)~(N×4+1) | k2×M |
| | (N×4)~(N+1) | k3×M |
| | N | M |
| | (N-1)~(N/4) | k4×M |
| | (N/4-1)~(N/8) | k5×M |
| | <(N/8) | k6×M |

| RAID GROUP IDENTIFICATION INFORMATION | UNIT OF TRANSFER (kbyte) | THE NUMBER OF I/O RECEPTION |
|---|---|---|
| #1 | > (N×8) | 0 |
| | (N×8) ~ (N×4) | 10 |
| | (N×4) ~ (N+1) | 5 |
| | N | 30 |
| | (N−1) ~ (N/4) | 5 |
| | (N/4) ~ (N/8) | 1000 |
| | < (N/8) | 0 |

US 9,727,279 B2

STORAGE CONTROL APPARATUS CONTROLLING ISSUABLE NUMBER OF REQUESTS AND STORAGE CONTROL METHOD THEREOF

CROSS-REFERENCE TO RELATED APPLICATION

This application is based upon and claims the benefit of priority from the prior Japanese Patent Application No. 2013-154585 filed on Jul. 25, 2013, the entire contents of which are incorporated herein by reference.

FIELD

The embodiments discussed herein are related to a storage control apparatus and a storage control method.

BACKGROUND

A redundant array of inexpensive disks (RAID) device is known as a storage control apparatus which handles a plurality of hard disk drives (HDDs) as a single logical volume. The RAID device includes drive enclosures (hereinafter, referred to as DEs) equipped with a plurality of HDDs and configures a RAID with the HDDs contained in the DEs. The RAID device allows an HDD configuration to be updated by either replacing an HDD within a DE or adding an HDD to a DE, or replacing or adding a DE.

The RAID device is required to provide a stable performance value (e.g., throughput and input/output per second (IOPS)) even when a change occurs in the HDD configuration. Therefore, the RAID device is equipped with an HDD verified as having a predetermined performance. Not only a lower limit but also an upper limit of the predetermined performance required for an HDD needs to be fit within a prescribed reference range.

The upper limit of the performance required for an HDD depends on internal processing of the HDD and thus, vendors of RAID devices and vendors of HDDs repeatedly change and verify firmware to achieve optimization of the firmware.

Related techniques are disclosed in, for example, Japanese Laid-Open Patent Publication No. 08-69359 and Japanese Laid-Open Patent Publication No. 08-63298.

Implementation of HDD compatibility with multiple vendors is being progressed in achieving optimization of supply chains accompanying globalization of markets and production bases. Such a flow of the implementation of HDD compatibility with multiple vendors tends to further improve in order to cope with causes of instability such as natural disasters or political unrests.

Further, HDDs having various performance properties exist according to diversification (such as, in size or revolving speed) of HDDs, in order to finely respond to the needs of users. Thus, a workload for achieving optimization of the firmware by the RAID device vendors and HDD vendors tends to increase more and more.

SUMMARY

According to an aspect of the present invention, provided is a storage control apparatus including a storage unit and a processor. The processor is configured to set an issuable number with respect to a logical volume on basis of a configuration of storage devices constituting the logical volume and performance of the storage devices. The issuable number is a number of requests issuable to the logical volume during a unit time period. The processor is configured to receive a request requesting access to the logical volume. The processor is configured to accumulate the received request in the storage unit. The processor is configured to issue requests accumulated in the storage unit to the logical volume while limiting a number of issued requests during the unit time period to a range of the issuable number.

The objects and advantages of the disclosure will be realized and attained by means of the elements and combinations particularly pointed out in the claims. It is to be understood that both the foregoing general descriptions and the following detailed descriptions are exemplary and explanatory, and are not restrictive of the invention, as claimed.

BRIEF DESCRIPTION OF DRAWINGS

FIG. 7 is a diagram illustrating an example of a performance information table according to the second embodiment;

FIG. 8 is a diagram illustrating an example of an I/O issuance number management table according to the second embodiment;

FIG. 10 is a diagram illustrating an example of a statistical information management table according to the second embodiment.

DESCRIPTION OF EMBODIMENTS

Hereinafter, descriptions will be made on exemplary embodiments with reference to accompanying drawings.

First Embodiment

Figure 1:
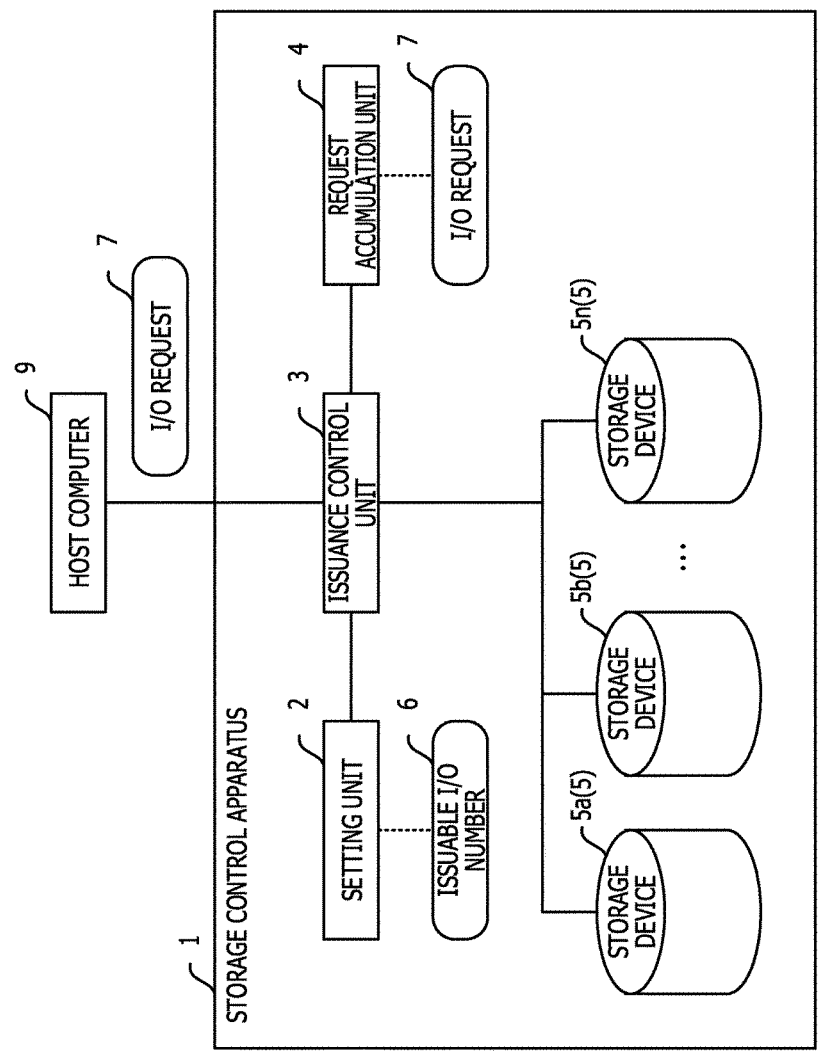
FIG. 1 is a diagram illustrating an exemplary configuration of a storage control apparatus according to a first embodiment.

First, a storage control apparatus according to a first embodiment will be described with reference to FIG. 1. FIG. 1 is a diagram illustrating an exemplary configuration of a storage control apparatus according to the first embodiment.

The storage control apparatus 1 receives from a host computer 9 an input/output (I/O) request 7 requesting access to a logical volume. The storage control apparatus 1 creates a logical volume from a plurality of storage devices 5 (5a, 5b, ..., 5n). The logical volume is, for example, a RAID. The storage device 5 is, for example, an HDD, but may be a solid state drive (SSD) such as a flash memory drive. The storage device 5 may be a storage device equipped in or externally attached to the storage control apparatus 1.

The storage control apparatus 1 includes a setting unit 2, an issuance control unit 3 and a request accumulation unit 4. The setting unit 2 sets an issuable I/O number 6 indicating the number of I/O requests issuable to a logical volume per unit time. The setting unit 2 sets the issuable I/O number 6 based on the performance of the storage device 5 and the configuration of the storage device 5 in the logical volume.

Accordingly, the storage control apparatus 1 may set the issuable I/O number on which the performance of the storage device 5, which constitutes the logical volume, is reflected. The issuance control unit 3 accumulates a received I/O request 7 with respect to the logical volume in the request accumulation unit 4. The issuance control unit 3 issues to the logical volume the I/O request 7 accumulated in the request accumulation unit 4. In this case, the issuance control unit 3 limits the number of I/O issuance per unit time to a range of the issuable I/O number 6.

Accordingly, even when the storage device 5 has an excessive response performance, the storage control apparatus 1 suppresses the logical volume from having an excessive response performance. The storage control apparatus 1 may exhibit a stable performance value even when a change occurs in a combination of the storage devices 5 constituting the logical volume. Therefore, the storage control apparatus 1 may reduce the workload accompanying the performance optimization of the storage device 5.

Second Embodiment

Figure 2:
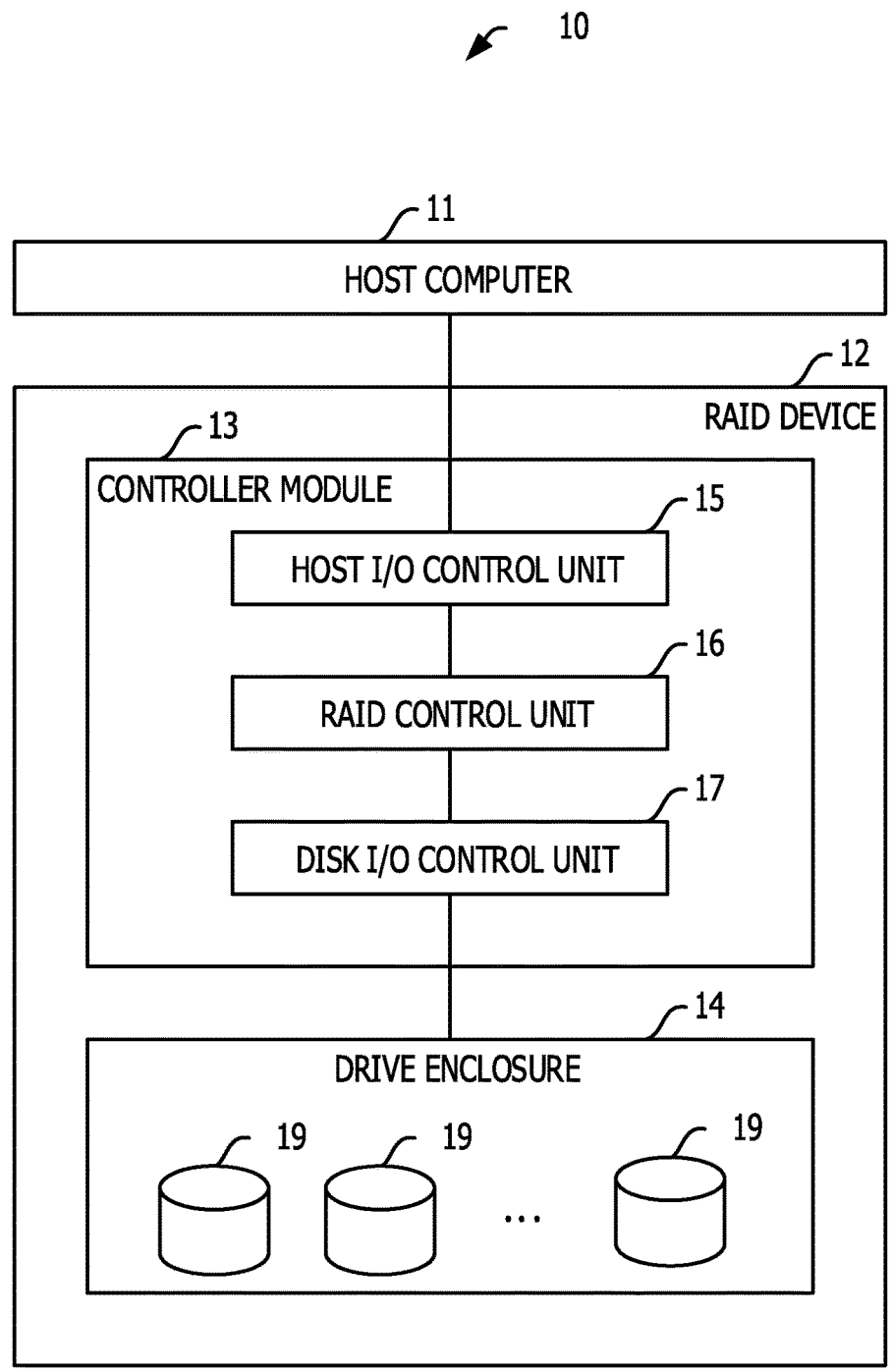
FIG. 2 is a diagram illustrating an exemplary configuration of a storage system according to a second embodiment.

Next, an example of connection of the storage devices of a second embodiment will be described with reference to FIG. 2. FIG. 2 is a diagram illustrating an exemplary configuration of a storage system according to the second embodiment.

The storage system 10 includes a host computer 11 and a RAID device 12 communicably connected with the host computer 11. The storage system 10 may include two or more host computers and two or more RAID devices. The RAID device 12 is a storage device which handles a plurality of HDDs 19 as a single logical volume. The RAID device 12 receives from the host computer 11 the I/O request requesting access to the RAID. The RAID device 12 includes a controller module (hereinafter, referred to as a CM) 13 and a DE 14.

The DE 14 is a chassis which accommodates a plurality of HDDs 19. The DE 14 is responsible for supplying power to the plurality of HDDs 19 and includes an interface which connects the HDDs 19 and the CM 13. In the RAID device 12, a RAID is configured by a combination of the plurality of HDDs 19 accommodated in the DE 14. The DE 14 may be a DE equipped inside or externally attached to the RAID device 12. The RAID device 12 may include two or more DEs.

The CM 13 is a sort of a storage control apparatus, and receives an I/O request (e.g., a Write request and a Read request) from the host computer 11 and controls access to the plurality of HDDs 19 accommodated in the DE 14. The CM 13 includes a host I/O control unit 15, a RAID control unit 16 and a disk I/O control unit 17. The RAID device 12 may be configured in a redundancy configuration having two or more CMs.

The host I/O control unit 15 controls interfacing operation between the host computer 11 and the CM 13. The CM 13 performs transmission and reception of required data to and from the host computer 11 through the host I/O control unit 15. The RAID control unit 16 manages the number of I/O issuance for each RAID group. The disk I/O control unit 17 controls interfacing operation between the DE 14 and the CM 13. The CM 13 performs transmission and reception of required data to and from the DE 14 through the disk I/O control unit 17.

Figure 3:
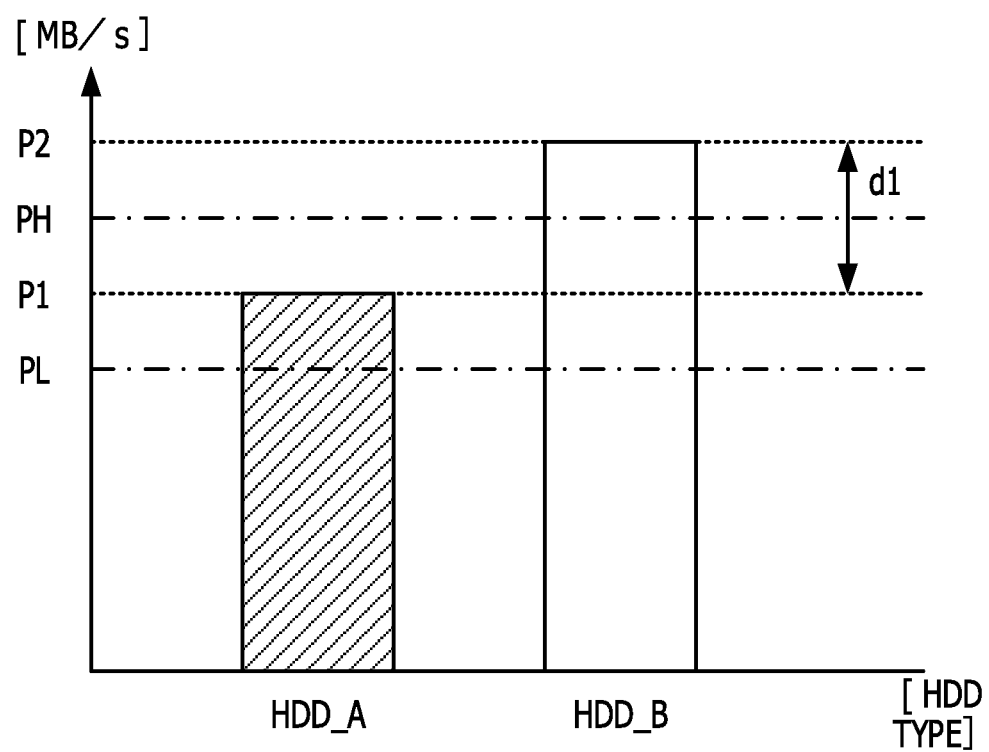
FIG. 3 is a diagram illustrating an example of RAID performance measurements in different types of HDD.

Here, an example of measurements of RAID performance in different types of HDD will be described with reference to FIG. 3. FIG. 3 is a diagram illustrating an example of RAID performance measurements in different types of HDD. HDD_A and HDD_B are HDDs interchangeable with each other in the RAID device 12. When access performance is measured under a predetermined condition, the performance of HDD_A and HDD_B are P1 (MB/s) and P2 (MB/s), respectively, and a difference in performance between HDD_A and HDD_B is d1 (MB/s).

HDD_A satisfies a lower limit PL of required performance and an upper limit PH of required performance while HDD_B satisfies the lower limit PL of required performance but does not satisfy the upper limit PH of required performance. For example, in a case where a RAID which satisfies performance demanded by a user is configured by a combination of the HDDs including HDD_B, when HDD_B is replaced with HDD_A, the performance demanded by the user may not be satisfied.

As described above, even when an upper limit of the number of I/O issuance is set for each HDD, the process after the issuance of the I/O request depends on the performance according to the type of HDD and thus, the performance of the RAID depends on processing in the HDD. Therefore, conventionally, the performance optimization of firmware of the HDD is achieved in a design stage in order for HDD_A and HDD_B to be operated with compatibility.

For example, a RAID device vendor performs a measurement of performance for a new HDD, calculates a required performance value based on the result of measurement, and notifies an HDD vendor of the required performance value. The HDD vendor updates the firmware of the HDD based on the notified required performance value and provides the updated firmware to the RAID device vendor. The RAID device vendor and the HDD vendor repeat the works described above until the required performance value is satisfied.

Figure 4:
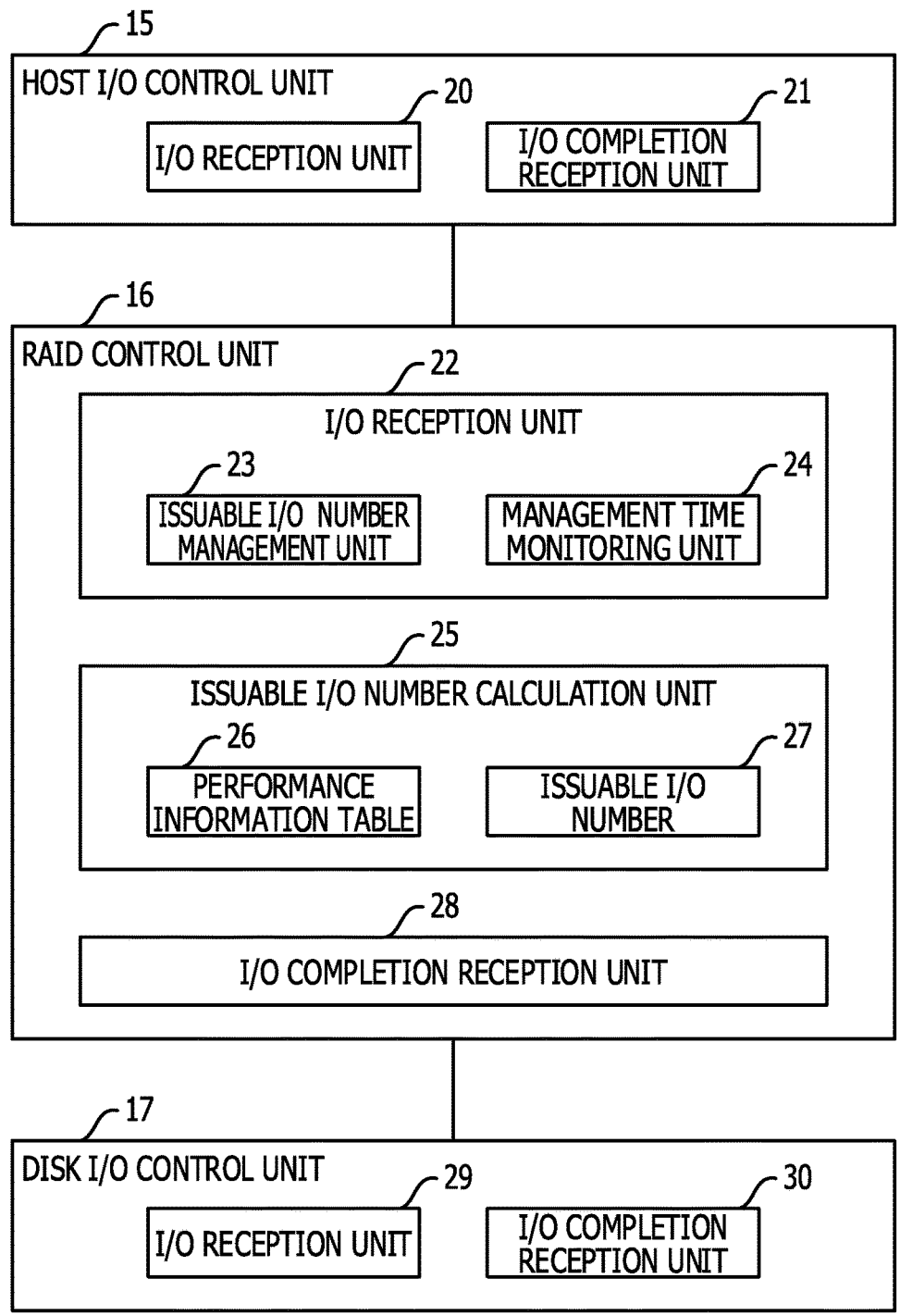
FIG. 4 is a diagram illustrating an exemplary configuration of a controller module according to the second embodiment.

A RAID control unit which performs a process of reducing a workload accompanying performance optimization of the HDD will be described with reference to FIG. 4. FIG. 4 is a diagram illustrating an exemplary configuration of a controller module according to the second embodiment.

The CM 13, as described above, includes the host I/O control unit 15, the RAID control unit 16, and the disk I/O control unit 17. The host I/O control unit 15 includes an I/O reception unit 20 and an I/O completion reception unit 21. The I/O reception unit 20 receives an I/O request from the host computer 11 and notifies the RAID control unit 16 of the I/O request. The I/O completion reception unit 21 receives an I/O completion acknowledgement from the RAID control unit 16 and notifies the host computer 11 of the I/O completion acknowledgement.

The RAID control unit 16 includes an I/O reception unit 22, an issuable I/O number calculation unit 25 and an I/O completion reception unit 28. The I/O reception unit 22 receives an I/O request from the host I/O control unit 15 and notifies the disk I/O control unit 17 of the I/O request while limiting the number of I/O issuance per unit time for each RAID group. The I/O reception unit 22 includes an issuable I/O number management unit 23 and a management time monitoring unit 24.

The issuable I/O number management unit 23 accumulates the I/O request received by the I/O reception unit 22 in an I/O issuance waiting queue and issues the I/O request to the disk I/O control unit 17 while limiting the number of I/O issuance per unit time to a range of the issuable I/O number 27. The management time monitoring unit 24 monitors unit time, as a management time, for a case where the number of I/O issuance is limited.

The issuable I/O number calculation unit 25 maintains a performance information table 26 set in advance and calculates the issuable I/O number 27 for each RAID group based on the performance information table 26 to maintain the issuable I/O number 27. The performance information table 26 indicates required performance for each RAID configuration parameter. Details of the performance information table 26 will be described later with reference to FIG. 7. The I/O completion reception unit 28 receives the I/O completion acknowledgement from the disk I/O control unit 17 and notifies the host I/O control unit 15 of the I/O completion acknowledgement.

The disk I/O control unit 17 includes an I/O reception unit 29 and an I/O completion reception unit 30. The I/O reception unit 29 receives the I/O request from the RAID control unit 16 and notifies an HDD 19 constituting the RAID of the I/O request. The HDD 19 receives the I/O request and performs a command process corresponding to the I/O request. After executing the command process, the HDD 19 notifies the I/O completion reception unit 30 of the I/O completion acknowledgement. The I/O completion reception unit 30 receives the I/O completion acknowledgement from the HDD 19 and notifies the RAID control unit 16 of the I/O completion acknowledgement.

Figure 5:
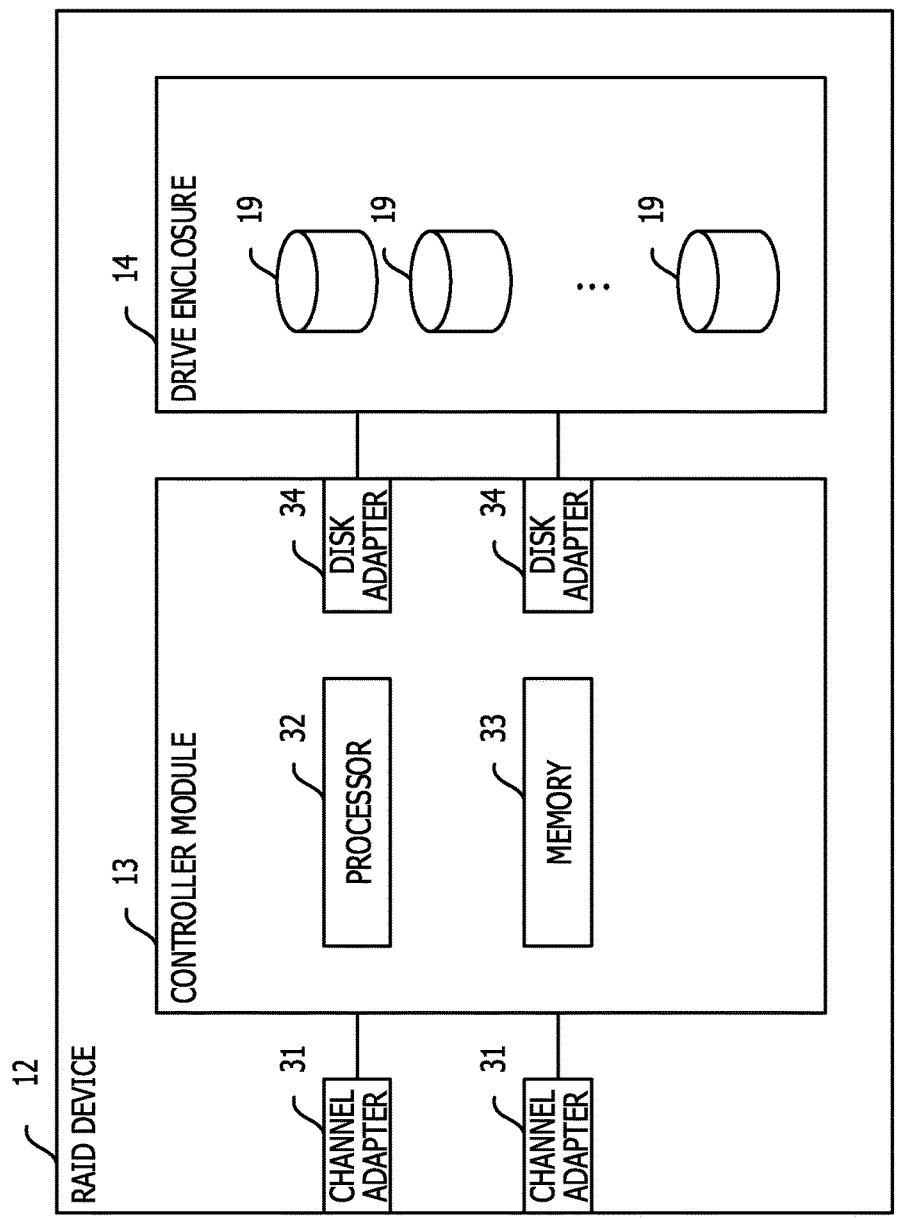
FIG. 5 is a diagram illustrating an exemplary hardware configuration of a RAID device according to the second embodiment.

Next, a hardware configuration of a RAID device according to the second embodiment will be described with reference to FIG. 5. FIG. 5 is a diagram illustrating an exemplary hardware configuration of a RAID device according to the second embodiment. The RAID device 12 includes channel adapters 31, the CM 13, and the DE 14. The RAID device 12 is connected with the host computer 11 through the channel adapters 31. The RAID device 12 includes a plurality of channel adapters 31 (e.g., two) and is connected to the host computer 11 with plural lines under a redundancy configuration of the plurality of channel adapters 31. The CM 13 is connected with the HDDs 19 accommodated in the DE 14 through disk adapters 34.

The CM 13 includes a processor 32, a memory 33 and the disk adapters 34, and these components are connected with each other through a bus (not illustrated). The processor 32 controls the entirety of the CM 13 and performs storage control including RAID control. The processor 32 may be a multiprocessor. The processor 32 is, for example, a central processing unit (CPU), a micro processing unit (MPU), a digital signal processor (DSP), an application specific integrated circuit (ASIC), and a programmable logic device (PLD). The processor 32 may be a combination of two or more components of the CPU, MPU, DSP, ASIC, and PLD.

The memory 33 includes, for example, a random access memory (RAM) and a non-volatile memory. The memory 33 functions as an I/O issuance waiting queue which temporarily accumulates the I/O request or a buffer used for recording data in the HDDs 19, in addition to maintaining data when data is read out from the HDDs 19. Further, the memory 33 stores user data or control information. The disk adapters 34 perform control (access control) of interfacing with the HDDs 19. For example, the RAM is used as a main storage device of the CM 13. At least a portion of a program of an operating system, firmware, and an application program to be executed by the processor 32 is temporarily stored in the RAM. Further, various data needed for processing by the processor 32 is stored in the RAM. The RAM may include a cache memory separately from a memory used for storing various data.

The non-volatile memory maintains stored contents even at the time of power shutdown of the RAID device 12. The non-volatile memory is, for example, a semiconductor storage device such as an electrically erasable and programmable read only memory (EEPROM) or a flash memory, and an HDD. The program of the operating system, firmware, application program and various data are stored in the non-volatile memory.

The processing functions of the RAID device 12 and the CM 13 according to the second embodiment may be implemented by the hardware configuration as described above. Further, the storage control apparatus 1 according to the first embodiment may also be implemented by the same hardware configuration as the RAID device 12 and the CM 13 described above.

Figure 6:
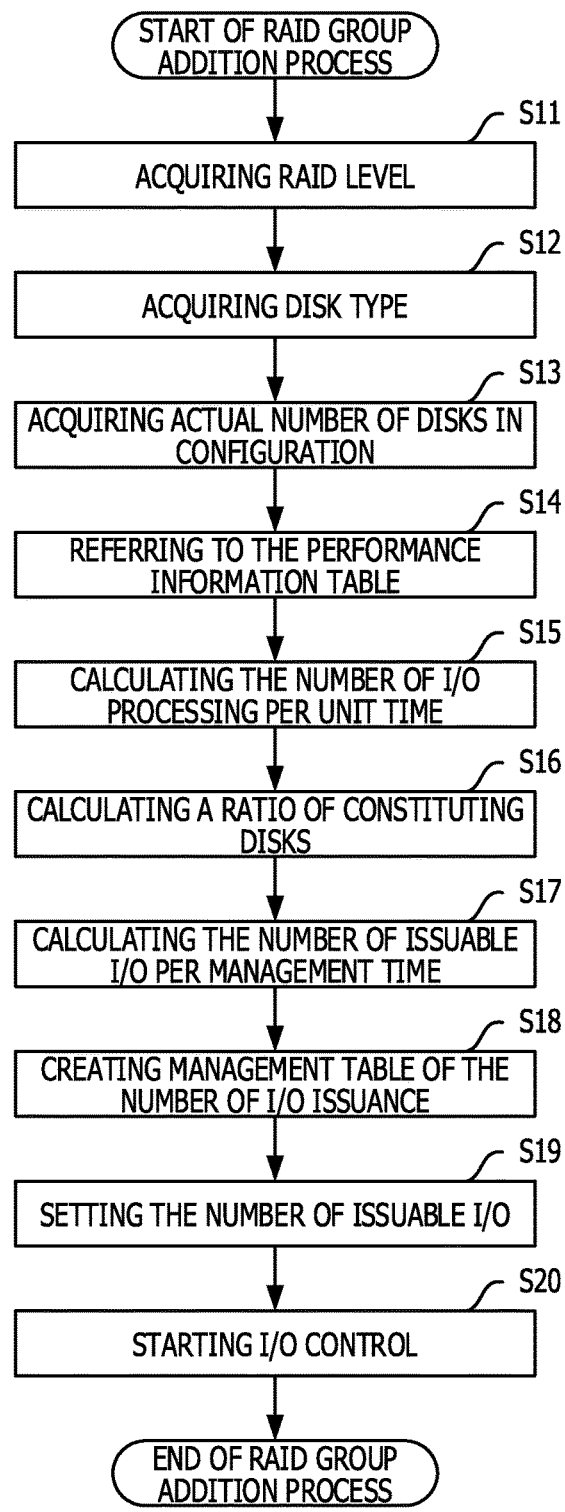
FIG. 6 is a flowchart illustrating a RAID group addition process according to the second embodiment.

Next, a RAID group addition process executed by the RAID control unit 16 according to the second embodiment will be described with reference to FIG. 6. FIG. 6 is a flowchart illustrating a RAID group addition process according to the second embodiment. The RAID group addition process is executed by the RAID control unit 16, specifically, the issuable I/O number calculation unit 25, when a new RAID group is added. The RAID group addition process is a process in which the issuable I/O number is determined for the newly added RAID group and the I/O control begins based on the determined issuable I/O number.

The RAID control unit 16 acquires a RAID level of the newly added RAID group (S11). The RAID level is, for example, RAID1, RAID5, RAID6, RAID1+0 or RAID5+0, but may be any other RAID level.

The RAID control unit 16 acquires a disk type (S12). The disk type is the revolving speed of the HDD. The revolving speed of the HDD is, for example, 15 kilo revolutions per minute (krpm), 10 krpm, or 7.2 krpm. The disk type is not limited to the revolving speed of the HDD, but may be any index which distinguishes disk performance. The disk type may be, for example, a size, recording capacity, buffer capacity, the maximum data reading-out speed or the maximum data recording speed, or mean time between failures (MTBF) of the HDD. The indexes which distinguish the disk performance is not limited to a single index but may include plural indexes. Further, the disk is not limited to an HDD, but may be, for example, an SSD.

The RAID control unit 16 acquires an actual number of disks in configuration (S13). The actual number of disks in configuration is the number of disks allocated to the newly added RAID group. The RAID control unit 16 refers to the performance information table (S14). The performance information table is prepared in advance for each disk type of each RAID level. For example, the performance information table is maintained in the memory 33, but may be acquired from an external device such as the host computer 11.

Here, the performance information table will be described with reference to FIG. 7. FIG. 7 is a diagram illustrating an example of a performance information table according to the second embodiment. A performance information table 100 is an example of a performance information table prepared in advance. The performance information table 100 includes fields for RAID level, disk type (revolving speed), basic number of disks in configuration, unit of transfer (kbyte) (transfer unit), and required performance (MB/s). The RAID level and the disk type (revolving speed) are fields used as index for referring to the corresponding performance information table among the performance information tables prepared in advance. The performance information table 100 of FIG. 7 is referenced when the RAID level and the disk type of the newly added RAID group is "RAID5" and "15 krpm", respectively. The basic number of disks in configuration is the number of disks according to the RAID level, and the basic number of disks in configuration of the RAID level of "RAID5" is "5".

The transfer unit is a unit for transferring data, which is set for the RAID group. For example, the transfer unit is classified into 7 stages based on a basic transfer unit "N". A first stage corresponds to "range larger than N×8", a second stage corresponds to "range from N×8 to N×4+1", a third stage corresponds to "range from N×4 to N+1", a fourth stage corresponds to "N", a fifth stage corresponds to "range from N−1 to N/4", a sixth stage corresponds to "range from N/4−1 to N/8", and a seventh stage corresponds to "range smaller than N/8". The transfer unit may be set in any number of stages, for example, five stages or ten stages. Further, a pitch width of each stage may be set in any pitch width.

The fourth stage of "N" (e.g., "8" kbyte for a main frame and "1000" kbyte for backup) is set as an initial value of the transfer unit. The transfer unit is updated at a required timing depending on activation status of the RAID group. The required performance is performance required for each transfer unit. For example, when the transfer unit is "N", the required performance is "200" MB/s.

The RAID control unit 16 calculates the number of I/O processing per unit time in a RAID group (S15). The RAID control unit 16 calculates the number of I/O processing per unit time by dividing the required performance of the performance information table 100 by the transfer unit. For example, when the required performance is "200" MB/s and the transfer unit is "N", the number of I/O processing per unit time is "200/N".

The RAID control unit 16 calculates a ratio of constituting disks in the RAID group (S16). The RAID control unit 16 calculates the ratio of constituting disks by dividing the actual number of disks in configuration acquired at S13 by the basic number of disks in configuration of the performance information table 100. For example, when the actual number of disks in configuration is "5" and the basic number of disks in configuration is "5", the ratio of constituting disks is "1", and when the actual number of disks in configuration is "6" and the basic number of disks in configuration is "5", the ratio of constituting disks is "1.2". The value of the ratio of constituting disks is larger than "1". The issuable I/O number may be further increased as the ratio of constituting disks increases.

The RAID control unit 16 calculates the issuable I/O number per management time (S17). The RAID control unit 16 calculates the issuable I/O number per management time as the product of the number of I/O processing per unit time calculated at S15, the ratio of constituting disks calculated at S16, and the management time. For example, when the number of I/O processing per unit time is "200/N", the ratio of constituting disks is "1", and the management time is "1 (second)", the issuable I/O number per management time is "200/N(=(200/N)×1×1)". The management time has a preset value.

The RAID control unit 16 creates an I/O issuance number management table which is a table for managing the number of I/O issuance (S18). The I/O issuance number management table is created for each RAID group. Here, the I/O issuance number management table will be described with reference to FIG. 8. FIG. 8 is a diagram illustrating an example of the I/O issuance number management table according to the second embodiment. An I/O issuance number management table 110 is an example of an I/O issuance number management table created for each RAID group by the RAID control unit 16. The I/O issuance number management table 110 includes fields for RAID group identification information, unit of transfer (kbyte) (transfer unit), and the number of issuable I/O (issuable I/O number). The RAID group identification information is identification information which may uniquely identify a RAID group. The I/O issuance number management table 110 illustrated in FIG. 8 is an I/O issuance number management table of a RAID group identified by RAID group identification information "#1". The transfer unit (kbyte) indicates a predetermined unit for transferring data. The transfer unit of the I/O issuance number management table 110 is identical with the transfer unit of the performance information table 100. The value calculated at S17 is set to issuable I/O number "M" corresponding to the transfer unit "N". The issuable I/O number of other transfer unit is set to a value obtained by multiplying the issuable I/O number "M" corresponding to the transfer unit "N" by a predetermined coefficient. For example, the issuable I/O number corresponding to the transfer unit "range from N×4 to N+1" is "k3×M". The predetermined coefficients "k1", "k2", "k3", "k4", "k5", "k6" are preset for each transfer unit.

The RAID control unit 16 maintains the created I/O issuance number management table in the memory 33. Accordingly, the RAID control unit 16 maintains the I/O issuance number management table in the memory 33 for each RAID group.

The RAID control unit 16 refers to the I/O issuance number management table and acquires and sets the issuable I/O number corresponding to the transfer unit which is currently set (S19). For example, the RAID control unit 16 refers to the I/O issuance number management table 110 and acquires the issuable I/O number "M" corresponding to the transfer unit "N" which is set as an initial value and sets "M" as the issuable I/O number of the RAID group identified by the RAID group identification information "#1".

Figure 9:
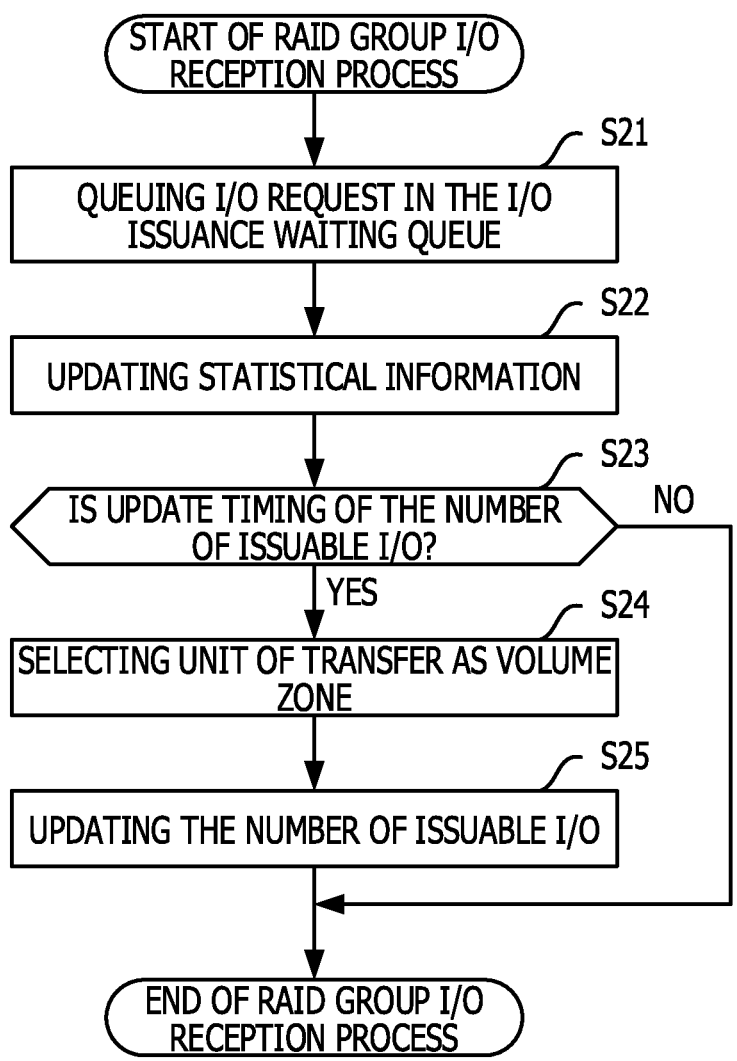
FIG. 9 is a flowchart illustrating a RAID group I/O reception process according to the second embodiment.

The RAID control unit 16 begins I/O control for the newly added RAID group and ends the RAID group addition process (S20). Next, a RAID group I/O reception process executed by the RAID control unit 16 according to the second embodiment will be described with reference to FIG. 9. FIG. 9 is a flowchart illustrating a RAID group I/O reception process according to the second embodiment. The RAID control unit 16 executes the RAID group I/O reception process upon receiving an I/O request from the host I/O control unit 15. The RAID group I/O reception process is a process of queuing the I/O request received from the host I/O control unit 15 in an I/O issuance waiting queue and updating the issuable I/O number which is set for the RAID group addition process.

The RAID control unit 16 (specifically, the issuable I/O number calculation unit 25) queues the I/O request received by the I/O reception unit 22 from the host I/O control unit 15 in the I/O issuance waiting queue of each RAID group corresponding to the I/O request (S21).

The RAID control unit 16 updates statistical information of I/O requests for each RAID group (S22). The statistical information includes the frequency in use of the transfer unit per predetermined monitoring time and is recorded in a statistical information management table. The statistical information management table is maintained in the memory 33. Here, the statistical information management table will be described with reference to FIG. 10. FIG. 10 is a diagram illustrating an example of a statistical information management table according to the second embodiment.

A statistical information management table 120 is an example of a statistical information management table managed by the RAID control unit 16 for each RAID group. The statistical information management table 120 includes fields for RAID group identification information, unit of transfer (kbyte) (transfer unit), and the number of I/O reception (I/O reception number). The RAID group identification information is identification information which uniquely identifies the RAID group.

The statistical information management table 120 illustrated in FIG. 10 is a statistical information management table of the RAID group identified by the RAID group identification information "#1". The transfer unit (kbyte) indicates a predetermined unit for transferring data. The transfer unit of the statistical information management table 120 is identical with the transfer unit of the performance information table 100 and the transfer unit of the I/O issuance number management table 110. The I/O reception number is the frequency in use of the transfer unit per predetermined monitoring time. Specifically, the I/O reception number is the frequency of receiving I/O requests counted for each transfer unit, according to a size of data of each I/O request received by the I/O reception unit 22. For example, the I/O reception number "30" corresponding to the transfer unit "N" indicates that the I/O request having a data size of "N" has been received thirty times during a predetermined monitoring time.

A time during which meaningful information may be collected, for example, 60 minutes, may be set as the predetermined monitoring time. The monitoring time may be set as a value which is common among RAID groups or a different value for each RAID group. The monitoring time may be a preset fixed value or a variable value according to the time zone or the number of I/O requests per unit time.

The RAID control unit 16 determines whether it is update timing of updating the issuable I/O number (S23). The update timing may be a preset update period (e.g., one minute) or a time at which a predetermined trigger is detected (for example, when any one of the I/O reception number of the statistical information management table 120 exceeds a predetermined value). When it is determined that it is the update timing of the issuable I/O number, the RAID control unit 16 proceeds to S24. When it is determined that it is not the update timing of the issuable I/O number, the RAID control unit 16 ends the RAID group I/O reception process.

The RAID control unit 16 refers to the statistical information management table to select a volume zone with regard to the I/O reception number (S24). For example, the RAID control unit 16 refers to the statistical information management table 120 to select the transfer unit of "range from N/4−1 to N/8" in which the I/O reception number becomes a number "1000", which is the maximum I/O reception number, as the volume zone with regard to the I/O reception number. The transfer unit to be selected as the volume zone is not limited to a case where the I/O reception number becomes the maximum and may be a transfer unit selected according to a predetermined selection basis, such as, an average value or a median value.

The RAID control unit 16 refers to the I/O issuance number management table and acquires and sets the issuable I/O number which corresponds to the selected transfer unit (S25). For example, when the transfer unit of "range from N/4−1 to N/8" is selected, the RAID control unit 16 refers to the I/O issuance number management table 110 to acquire the issuable I/O number of "k5×M" corresponding to the transfer unit of "range from N/4−1 to N/8" and set "k5×M" as the issuable I/O number of the RAID group identified by the RAID group identification information "#1". The RAID control unit 16 sets the issuable I/O number and then, ends the RAID group I/O reception process.

Figure 11:
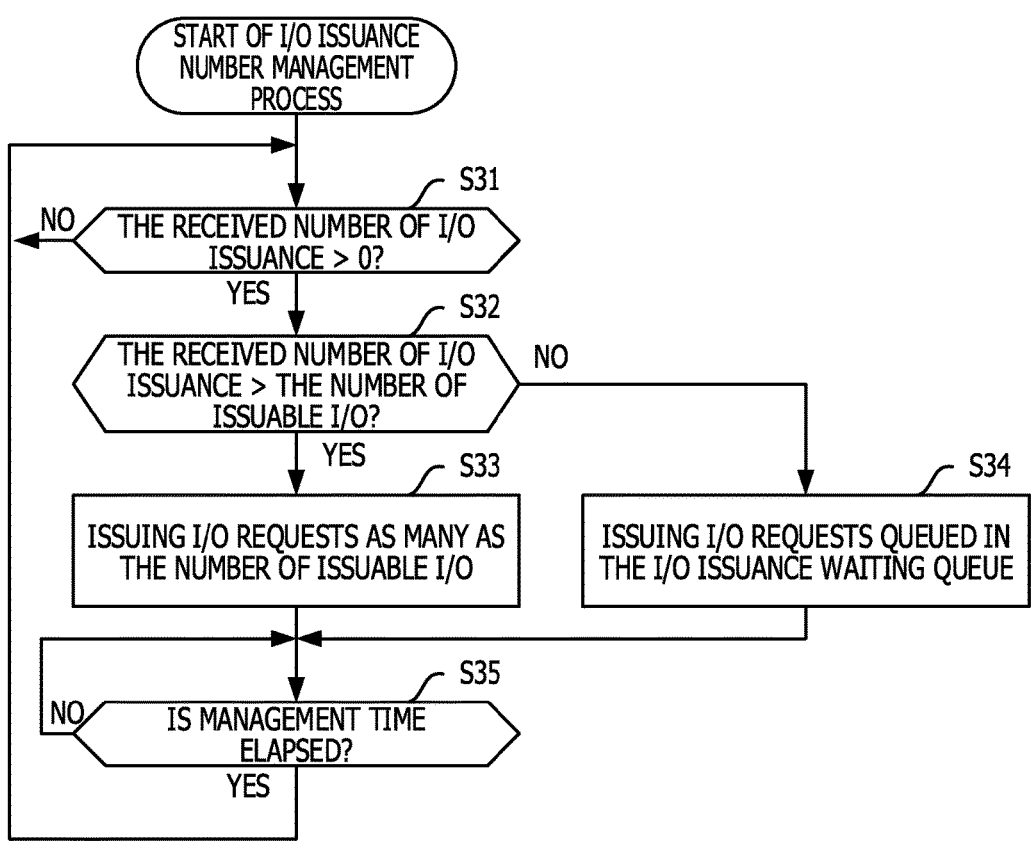
FIG. 11 is a flowchart illustrating an I/O issuance number management process according to the second embodiment.

As described above, the issuable I/O number may be appropriately updated according to the I/O request received. Next, an I/O issuance number management process executed by the RAID control unit 16 according to the second embodiment will be described with reference to FIG. 11. FIG. 11 is a flowchart illustrating an I/O issuance number management process according to the second embodiment. The I/O issuance number management process is executed upon beginning of the I/O control for the RAID group. The I/O issuance number management process is a process of issuing I/O requests queued in the I/O issuance waiting queue to the RAID group while limiting the number of issued I/O requests to a range of the issuable I/O number.

The RAID control unit 16 (specifically, the issuable I/O number management unit 23) determines whether the number of I/O requests queued in the I/O issuance waiting queue (the received number of I/O issuance) is larger than "0" (S31). That is, the RAID control unit 16 determines whether an I/O request queued in the I/O issuance waiting queue exists. When it is determined that the I/O request queued in the I/O issuance waiting queue exists, the RAID control unit 16 proceeds to S32. When it is determined that no I/O request queued in the I/O issuance waiting queue exists, the RAID control unit 16 waits until an I/O request is queued into the I/O issuance waiting queue.

The RAID control unit 16 determines whether the received number of I/O issuance exceeds the issuable I/O number which is set for the RAID group (S32). When it is determined that the received number of I/O issuance exceeds the issuable I/O number, the RAID control unit 16 proceeds to S33. When it is determined that the received number of I/O issuance does not exceed the issuable I/O number, the RAID control unit 16 proceeds to S34.

The RAID control unit 16 issues the I/O requests as many as the issuable I/O number, among the I/O requests queued in the I/O issuance waiting queue, towards the disk I/O control unit 17 (S33).

The RAID control unit 16 issues the I/O requests queued in the I/O issuance waiting queue towards the disk I/O control unit 17 (S34). The RAID control unit 16 waits until a management time elapses after issuance of the I/O requests (S35). This management time is the management time used during calculation of the issuable I/O number at S17 of the RAID group addition process. When it is determined that the management time elapses after issuance of the I/O requests, the RAID control unit 16 proceeds to S31. When it is determined that the management time does not elapse after issuance of the I/O requests, the RAID control unit 16 waits until the management time elapses.

As described above, the RAID control unit 16 may limit the number of I/O requests to be issued towards the RAID group to a range of the issuable I/O number per management time. Accordingly, even when the processing performance of some of the HDDs 19 constituting the RAID group is excessive, the number of I/O processing for the RAID group does not become excessive.

Accordingly, even when the HDDs 19 having different upper limits of performance are installed, the RAID device 12 may obtain a predetermined performance value when a RAID group is configured by the HDDs 19. Such a RAID device 12 does not become an obstacle in promoting the implementation of compatibility of the HDD 19, which is to be installed in the RAID device 12, with multiple vendors. Further, the RAID device 12 may reduce the workload of the RAID device vendors and HDD vendors accompanying the optimization of performance of the HDD 19 to be installed.

In the RAID device 12, when an HDD 19 constituting the RAID group is replaced due to a failure, for example, a response performance of the RAID group is not significantly changed. Accordingly, the RAID device 12 may provide a RAID group which exhibits a stable performance to the user before and after maintenance.

When a new RAID group is configured, a difference in performance between the newly configured RAID group and the existing RAID group does not become excessive in the RAID device 12. Accordingly, the RAID device 12 may provide a RAID group which exhibits a stable performance to the user.

The processing functions described above may be implemented by a computer. In such a case, a program is provided in which processing contents of functions to be equipped in the storage control apparatus 1, RAID device 12 and the CM 13 are described. The processing functions described above are implemented in the computer by executing the program by the computer. The program in which the processing contents are described may be recorded in a computer-readable recording medium. The computer-readable recording medium is, for example, a magnetic storage device, an optical disk, an opto-magnetic recording medium, or a semiconductor memory. The magnetic storage device is, for example, an HDD, a flexible disk (FD), or a magnetic tape. The optical disk is, for example, a digital versatile disc (DVD), a DVD-RAM, compact disc (CD), or CD-ROM/RW. The opto-magnetic recording medium is, for example, a magneto-optical disk (MO).

When the program is distributed, for example, a portable recording medium such as a DVD or CD-ROM in which the program is recorded is sold. The program may be stored in a storage device of a server computer and transferred from the server computer to another computer through a network.

The computer which executes the program stores the program recorded in the portable recording medium or transferred from the server computer in an own storage device of the computer. The computer reads the program from its own storage device and executes the program. The computer may read the program directly from the portable recording medium and execute the program. The computer may sequentially execute the received program each time when the program is transferred from the server computer through the network.

At least a portion of the processing functions described above may be implemented by an electronic circuit such as a DSP, ASIC, and PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control apparatus, comprising:
a storage unit; and
a processor configured to:
set an issuable number of access request to be issued to a logical volume during a unit time period on basis of a configuration of storage devices constituting the logical volume, the issuable number being calculated to be within a range by considering different performance values of the storage devices,
receive a request requesting access to the logical volume,
accumulate requests to access the logical volume including the received request in the storage unit, and
control a number of requests issued to the logical volume from among the accumulated requests in the storage unit to maintain the number of the issued requests during the unit time period to the range of the issuable number when a change in the performance values of the storage devices occurs.

2. The storage control apparatus according to claim 1, wherein the processor is configured to
maintain the number of the issued requests to the issuable number when the change in the performance values of the storage devices changes performance of the storage devices and the configuration of the storage devices.

3. The storage control apparatus according to claim 1, wherein the processor is configured to
change the issuable number in accordance with transfer units of requests issued for a predetermined time, the transfer units being units for transferring data.

4. The storage control apparatus according to claim 3, wherein the processor is configured to
maintain statistical information with regard to the transfer units of the requests issued for the predetermined time, and
select a transfer unit on basis of the statistical information.

5. The storage control apparatus according to claim 3, wherein the processor is configured to
calculate an issuable number for each of the transfer units upon creation of the logical volume.

6. A non-transitory computer-readable recording medium having stored therein a program for causing a computer to execute a process, the process comprising:
setting an issuable number of access request to be issued to a logical volume during a unit time period on basis of a configuration of storage devices constituting the logical volume, the issuable number being calculated to be within a range by considering different performance values of the storage devices;
receiving a request requesting access to the logical volume;
accumulating requests to access the logical volume including the received request in a storage unit; and
controlling a number of requests issued to the logical volume from among the accumulated requests in the storage unit to maintain the number of the issued requests during the unit time period to the range of the issuable number when a change in the performance values of the storage devices occurs.

7. A storage control method, comprising:
setting, by a storage control apparatus, an issuable number of access request to be issued to a logical volume during a unit time period on basis of a configuration of storage devices constituting the logical volume and performance of the storage devices, the issuable number being calculated to be within a range by considering different performance values of the storage devices;

receiving a request requesting access to the logical volume;

accumulating requests to access the logical volume including the received request in a storage unit; and controlling a number of requests issued to the logical volume from among the accumulated requests in the storage unit to maintain the number of the issued requests during the unit time period to the range of the issuable number when a change in the performance values of the storage devices occurs.

8. The storage control apparatus according to claim 1, wherein, upon lapse of the unit time period, the issuable number of access request is adjusted based on a ratio of a number of the storage devices constituting the logical volume prior to and subsequent to the change.

9. The storage control apparatus according to claim 6, wherein, upon lapse of the unit time period, the issuable number of access request is adjusted based on a ratio of a number of the storage devices constituting the logical volume prior to and subsequent to the change.

10. The storage control apparatus according to claim 7, wherein, upon lapse of the unit time period, the issuable number of access request is adjusted based on a ratio of a number of the storage devices constituting the logical volume prior to and subsequent to the change.

* * * * *